US006297730B1

(12) United States Patent
Dickinson

(10) Patent No.: US 6,297,730 B1
(45) Date of Patent: Oct. 2, 2001

(54) SIGNAL CONNECTION DEVICE FOR A POWER LINE TELECOMMUNICATION SYSTEM

(75) Inventor: John Dickinson, Burnley (GB)

(73) Assignee: Nor.Web DPL Limited, Slough (GB)

( * ) Notice: Subject to any disclaimer, the term of this patent is extended or adjusted under 35 U.S.C. 154(b) by 0 days.

(21) Appl. No.: 09/371,302

(22) Filed: Aug. 10, 1999

(30) Foreign Application Priority Data

Aug. 14, 1998 (GB) .................................................. 9817840

(51) Int. Cl.[7] .................................................... H04M 11/04

(52) U.S. Cl. .................. 340/310.01; 307/3; 340/310.08; 340/638

(58) Field of Search ......................... 340/310.08, 310.01, 340/638, 310.06; 361/64, 102; 705/10; 307/3

(56) References Cited

U.S. PATENT DOCUMENTS

| | | | |
|---|---|---|---|
| 4,124,835 | 11/1978 | Cahill, Jr. | 337/1 |
| 4,302,750 * | 11/1981 | Wadhwani et al. | 340/870.02 |
| 4,772,870 | 9/1988 | Reyes . | |
| 5,684,450 | 11/1997 | Brown | 340/310.02 |
| 5,717,685 | 2/1998 | Abraham | 370/30 |
| 5,977,650 * | 11/1999 | Rickard et al. | 307/3 |
| 6,023,106 * | 2/2000 | Abraham | 307/3 |
| 6,157,527 * | 12/2000 | Spencer et al. | 361/64 |

FOREIGN PATENT DOCUMENTS

| | | | |
|---|---|---|---|
| WO95/19070 | 7/1995 | (WO) | H04B/3/54 |
| WO95/29536 | 11/1995 | (WO) | H04B/3/54 |
| WO98/33258 | 7/1998 | (WO) | H02J/13/00 |

OTHER PUBLICATIONS

Draft Standard, "Signalling on Low–Voltage Electrical Installations in the Frequency Band 3kHz to 148.5kHz, Part 4: Filters at the Interface of the Indoor and Outdoor Electricity Network," EN50 065–4, Apr. 1992, p. 1–11.

Lokken et al., "The Proposed Wisconsin Electric Power Company Load Mangement System Using Power Line Carrier Over Distribution Lines," 1976 Nat. Telecomm. Conf. Dallas, USA Nov. '76 (IEEE), p. 2.2–1–2.2–3.

Russell, "Communication Alternatives for Distribution Metering and Load Management," IEEE Transactions on Power Apparatus and Systems, vol. PAS–99, No. 4, Jul./Aug. 1980, p. 1448–1455.

Barstow, "A Carrier Telephone System for Rural Service," AIEE Transactions, vol. 66, 1947, p. 501–507.

* cited by examiner

*Primary Examiner*—Brent A. Swarthout
(74) *Attorney, Agent, or Firm*—Howrey Simon Arnold & White, LLP

(57) ABSTRACT

The present invention provides a signal connection installation including a signal connection device connected to a power fuse holder, in which the power fuse holder holds a power fuse cartridge which carries a supply of mains electrical power in use and in which a conductive component of the signal connection device makes electrical contact with a conductive component of the power fuse cartridge wherein the signal connection device is releasably secured to the fuse holder and the signal connection device includes a signal path interconnecting the mains supply and a communication signal connection, which signal path includes a filter which presents a low impedance to communication signals and a high impedance to mains electricity.

14 Claims, 3 Drawing Sheets

SIGNAL CONNECTION DEVICE FOR A POWER LINE TELECOMMUNICATION SYSTEM

The present invention relates to a signal connection device for a power line telecommunication system.

Various published patent applications of the present applicant disclose systems whereby a telecommunication signal can be conveyed into a consumer's premises carried on a supply cable for mains electricity. Once inside the premises, a connection must be made to the supply cable to enable extraction of the telecommunication signal from the supply cable. A connection between a trunk data network and an electrical supply cable must also be made at some point, for example within a substation, There are clear advantages in minimizing the amount of work which must be carried out on mains conductors during installation of a power line telecommunication system in a consumer's premises or at a substation. To ensure safety, any such work can be carried out only by a suitably qualified person, and this requirement adds to the cost of the installation. It is also clearly desirable that the level of disruption caused by installation of a power line telecommunication system is minimized, most preferably to the extent that the supply of mains electricity to the premises need not be interrupted.

The present invention, in a first of its aspects, provides a signal connection device for making a communication signal connection to a mains electricity supply, the device being suitable for connection to the mains supply at a power fuse of the mains supply.

In most installations, power fuses are readily accessible for purposes of maintenance and replacement. Furthermore, in most cases, a power fuse is specifically designed such that it can be accessed by non-experts. Therefore, a power fuse can provide a readily accessible location for making a data connection into the mains supply line.

Conveniently, a signal connection device embodying the invention can be releasably secured to a fuse holder. In such embodiments, the signal connection device may include a conductor which makes a connection with a cartridge power fuse within the fuse holder.

In most embodiments, the signal connection device has a signal path interconnecting the mains supply and the communication signal connection, which signal path includes a filter which presents a low impedance to communication signals and a high impedance to mains electricity. Most typically, such a connection device includes a signal fuse in the signal path. In such embodiments, the signal fuse may make direct contact with the power fuse.

In embodiments as set forth in the last-preceding paragraph, the filter will typically include one or more series capacitors. In order to avoid any risk that the signal connection could become live with mains electricity in the event of such capacitors failing in a short-circuit mode, there is typically provided in such a signal connection device a conductive path of low impedance to mains electricity between the signal connection and earth. This conductive path allows a current to flow in the event of such a failure, so as to cause the signal fuse to blow.

In a typical embodiment, a signal connection device has a mechanical connector by means of which it may be connected to a power fuse holder.

In another of its aspects, the invention provides a signal connection installation comprising a signal connection device according to the first aspect of the invention connected to a power fuse holder.

In such a signal connection installation, the power fuse holder holds a power fuse which carries a supply of mains electricity, and a conductive component of the signal connection device makes electrical contact with a conductive component of the power fuse.

Embodiments of the invention will now be described in detail, by way of example, and with reference to the accompanying drawings in which.

Figure 2:
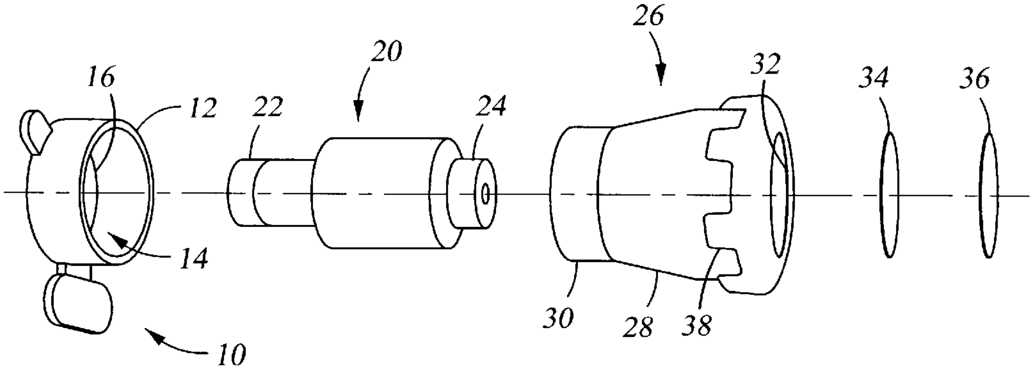
FIG. 2 is an exploded diagram of a fuse holder with which the device of FIG. 1 can be used.

With reference first to FIG. 2, there is shown a fuse assembly which is commonly used in a mains electricity supply conductor to a consumer's premises.

The fuse assembly includes a self-contained power fuse cartridge 20. The power fuse cartridge 20 has an insulating body of e.g. circular cross-section, in some embodiments varying in diameter along its axial length. First and second conductive contacts 22,24 are carried on opposite end portions of the body, the contacts 22,24 being electrically interconnected within the body by a fusible link.

The fuse assembly further includes a base component 10 which is intended to be secured for use on a suitable fixed support. An electrical connection to the base unit 10 is made from an external mains electricity supply and from the base unit 10 to an electrical installation within a customer's premises.

The base component 10 includes a ceramic body 12 within which is formed a recess 14. Within the recess there is a central electrical contact (not shown) which is connected to the external mains electricity supply. A surrounding contact 16 is concentric with the central contact, and is formed to have an internally-threaded bore. The surrounding contact 16 is connected to a conductor feeding an electrical installation within a customer's premises.

The fuse assembly further includes a fuse holder 26. The fuse holder 26 has an insulating body 28, typically of ceramic material, which partially encloses and surrounds a metal insert 30. Part of the metal insert projecting from the body 28 is externally threaded such that it can be threaded into mechanical and electrical connection with the surrounding contact 16 of the base component 10. Within the body 28, the insert 30 has a transverse end wall through which a central aperture is formed.

The power fuse cartridge 20 is located with its second contact 24 within the fuse holder 26, such that the contact 24 is in electrical contact with the metal insert 30. The fuse holder 26 is then secured to the base component 10 by screwing the insert 30 onto the surrounding contact 16 of the base component 10. This causes the first contact 22 of the power fuse cartridge 20 to be urged against the central contact of the base component 10, thereby creating an electrical conductive path between the contacts of the base unit, through the power fuse cartridge 20. The fuse holder 26 is shaped and dimensioned such that a portion of it fits closely within the recess 14 of the base component 10 so as to enclose the live contacts of the base component 10 and of the power fuse cartridge 20.

The body 28 of the fuse holder 26 has a circular viewing aperture 32 adjacent to the end wall of the insert 30.

Provision of such a viewing aperture enables an engineer to inspect markings on the power fuse cartridge 20 which are typically provided to indicate its current-carrying rating. For normal use, the viewing aperture 32 is closed by a disc of glass 34 retained in the aperture by a circlip 36.

Figure 1:
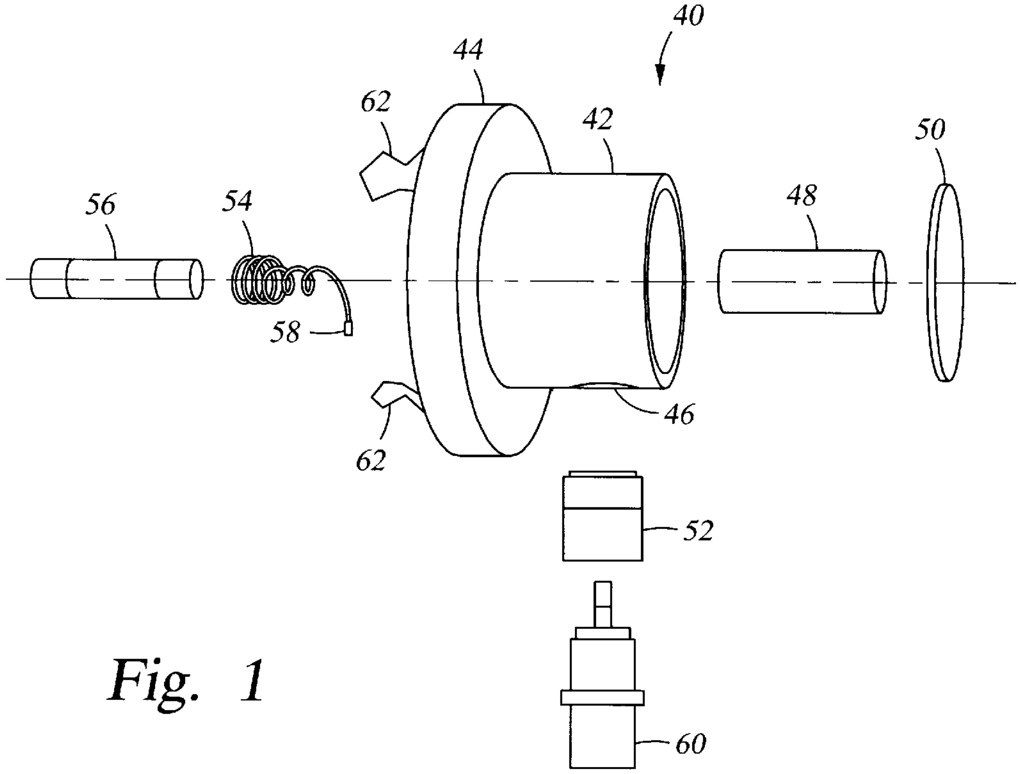
FIG. 1 is an exploded diagram of a signal connection device embodying the invention.

The signal connection device, as shown in FIG. 1, comprises a body 40. The body includes a disc-shaped head portion 44 and a cylindrical tail portion 42 which projects coaxially from the head portion 44. An axial aperture (not shown) extends through the head portion 44 to communicate with a space within the tail portion 42. A radial bore 46 is formed in the tail portion 42, the bore 46 being tapped with an internal screw thread. Within the tail portion 42 is an axial tube 48. The tube 48 is aligned with the aperture, and is retained in place within the tail portion 42 by an end cap 50. Signal separation and processing circuitry can conveniently be located and potted in the tail portion 42 surrounding the tube 48.

An externally threaded tubular adapter 52 is secured in the bore 46. Internally, the adapter 52 is configured to receive and retain a signal connector 60 at which a signal line (not shown) can be connected to the device. The signal connector 60 is connected electrically to signal processing circuitry within the tail portion 42.

Within the tube 48, at an end portion close to the end cap 50, there is located a fuse retainer 54. A cylindrical cartridge fuse 56 (which will be referred to as the signal fuse) is inserted into the tube 48 through the aperture such that one of its contacts connects with, and is removably gripped by, the fuse retainer 54. At least a part of the fuse retainer 54 acts as a compression spring arranged such that the signal fuse 56 initially extends through the aperture to project from the body 40, and such that it can be urged into the body 40 against a spring force. Electrical interconnection is made between the signal fuse 56 and the signal connector 60 through a signal lead 58 secured to the fuse retainer 54.

Several retaining clips 62 project from the head portion 44. The retaining clips 62 are formed as loops of resilient wire and are spaced circumferentially around the head portion 44 in an approximately axial direction away from the tail portion.

The signal connection device is deployed on a fuse holder of the type described with reference to FIG. 2 in a manner now to be described, to constitute, in combination, a signal connection installation.

The circlip 36 is first removed to enable the glass 34 to be then taken from the viewing aperture 32. Then, the connection device is offered up such that the signal fuse 56 projects into the viewing aperture 32 to make contact with the second conductive contact 24 of the power fuse cartridge 20. The retaining clips 62 engage around the periphery of the body 28 of the fuse holder 26 to retain the connection device in place. The body 28 most typically has radially-projecting raised formations 38 onto which the retaining clips 62 can locate.

Contact with the power fuse cartridge 20 causes the signal fuse 56 to be displaced into the body 40 against the spring force thereby enhancing the contact between the power fuse cartridge 20 and the signal fuse 56.

The retaining clips 62 are configured to grip tightly enough to prevent the signal connection device becoming dislodged in normal use. However, care must also be taken to ensure that the signal connection device can become disconnected from the fuse holder in the event that it is knocked or an excessive force is applied to a cable connected to it without damage being caused to the fuse holder or any other piece of mains electrical supply equipment.

Figure 3:
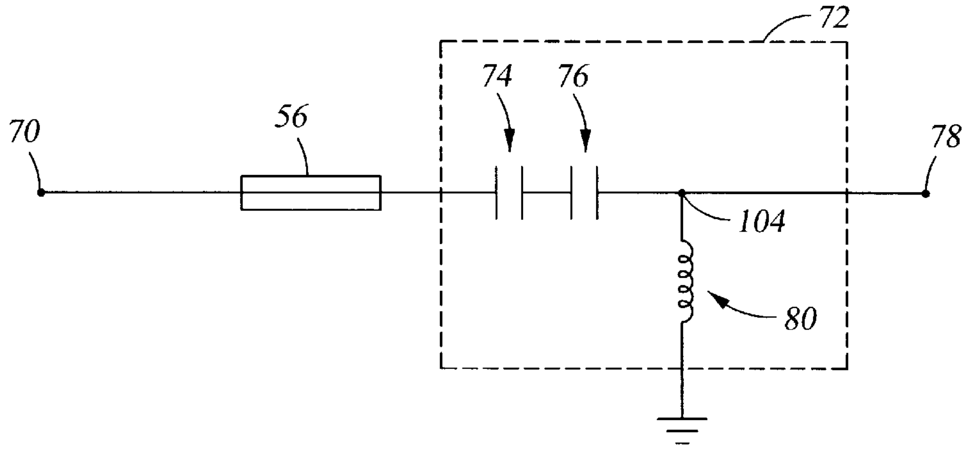
FIG. 3 is a diagram of a first possible electrical arrangement of the device of FIG. 1.

With reference now to FIG. 3, there is shown one possible arrangement of processing circuitry contained within the body 40.

In FIG. 3, the numeral 70 indicates the point at which the signal fuse 56 makes contact with the power fuse cartridge 20, and the numeral 7B indicates the connection of the processing circuitry to the signal connector 60.

Combined electrical mains and communications signals are connected through the signal fuse 56 to the processing circuitry 72. The processing circuitry 72 includes two capacitors 74,76 connected in series between the fuse and the signal connector 60. These capacitors 74, 76 appear as an extremely high impedance to signals at the frequency of electrical mains, but appear to the communication signals as a low impedance.

Thus, the processing circuitry passes communication signals between the signal fuse 56 and the signal connector 60, but prevents passage of mains electricity from the signal fuse 56 to the signal connector 60. Conveniently, some or all of the processing circuitry 72 can be located in an annular space surrounding the tube 48 within the tail portion 42 of the body 40.

Measures must be taken to prevent mains voltage being fed to the signal connector 60 in the event that both of the capacitors 74, 76 were to fail in a short-circuit mode. It must be remembered that the signal connector 60 will typically be connected to a load of impedance in the order of 50Ω which may not draw sufficient current to blow the signal fuse 56. Therefore, an inductor 80 connects to earth a point 104 between the capacitors 74, 76 and the signal connector 60. In the event that any signals of mains frequency pass the capacitors 80, the inductor provides for them a low-impedance path to earth. In the event that the capacitors 74, 76 fail in a short-circuit mode, mains current will follow this path to earth and will cause the signal fuse 56 to blow.

In an alternative configuration, processing circuitry within the device itself may be limited to provision of a high-pass filter, with an external safety circuit being provided to provide protection in the event of a short-circuit mode failure of the high-pass filter. This arrangement is shown in FIG. 4.

Figure 4:
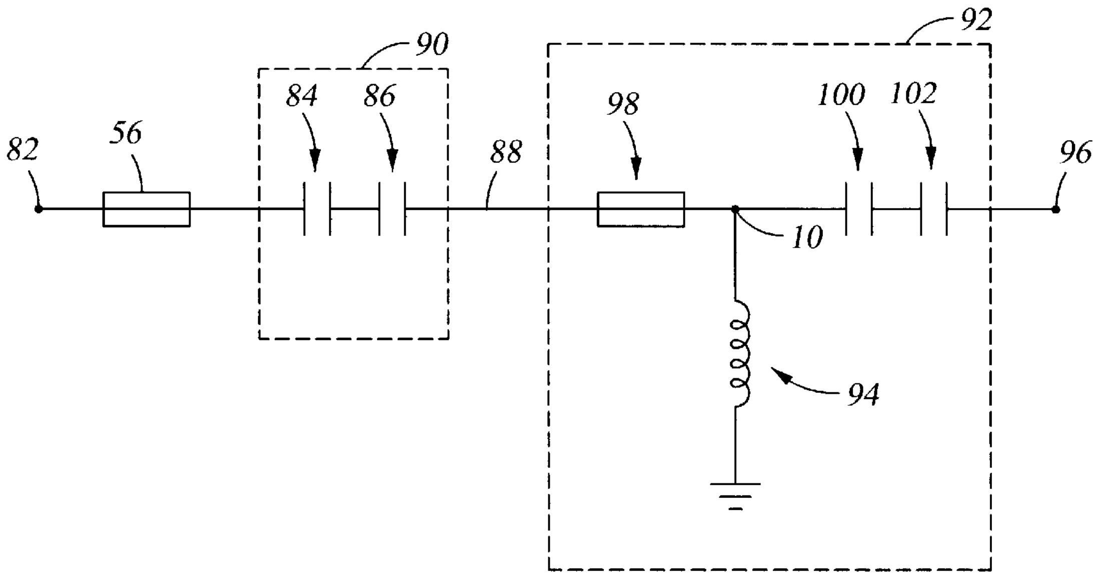
FIG. 4 is a diagram of a second possible electrical arrangement of the device of FIG. 1.

In FIG. 4, the numeral 82 indicates the point at which the signal fuse 56 makes contact with the power fuse cartridge 20, and the numeral 88 indicates the connection of the processing circuitry to the signal connector 60.

Combined electrical mains and communications signals are connected through the signal fuse 56 to the processing circuitry 90. The processing circuitry 90 includes two capacitors 84, 86, connected in series between the fuse and the signal connector 60 to act as a high-pass filter in a similar manner to the arrangement described with reference to FIG. 3.

In this arrangement, signals from the signal connector 60 are carried to a safety circuit, shown diagrammatically at 92. The safety circuit 92 provides a low-impedance signal path for communication signals between the signal connector 60 and a signal terminal 96. Most essentially, the safety circuit 92 includes an inductor 94 connected between the signal path at 106 and earth. Additionally, the safety circuit, in this embodiment, includes a second signal fuse 98 and two further capacitors 100,102 connected in series in the signal path.

Suitable component values are as follows:

all the capacitors 74,76,84,86,100,102: 22 nF the inductors 80,94: 1 mH the signal fuse 56: 1 A the further signal fuse 98: 3 A The fuses must be of high rupture capacity type to ensure that arcing is minimized even in the event that a short circuit causes a very large current to flow through them.

Figure 5:
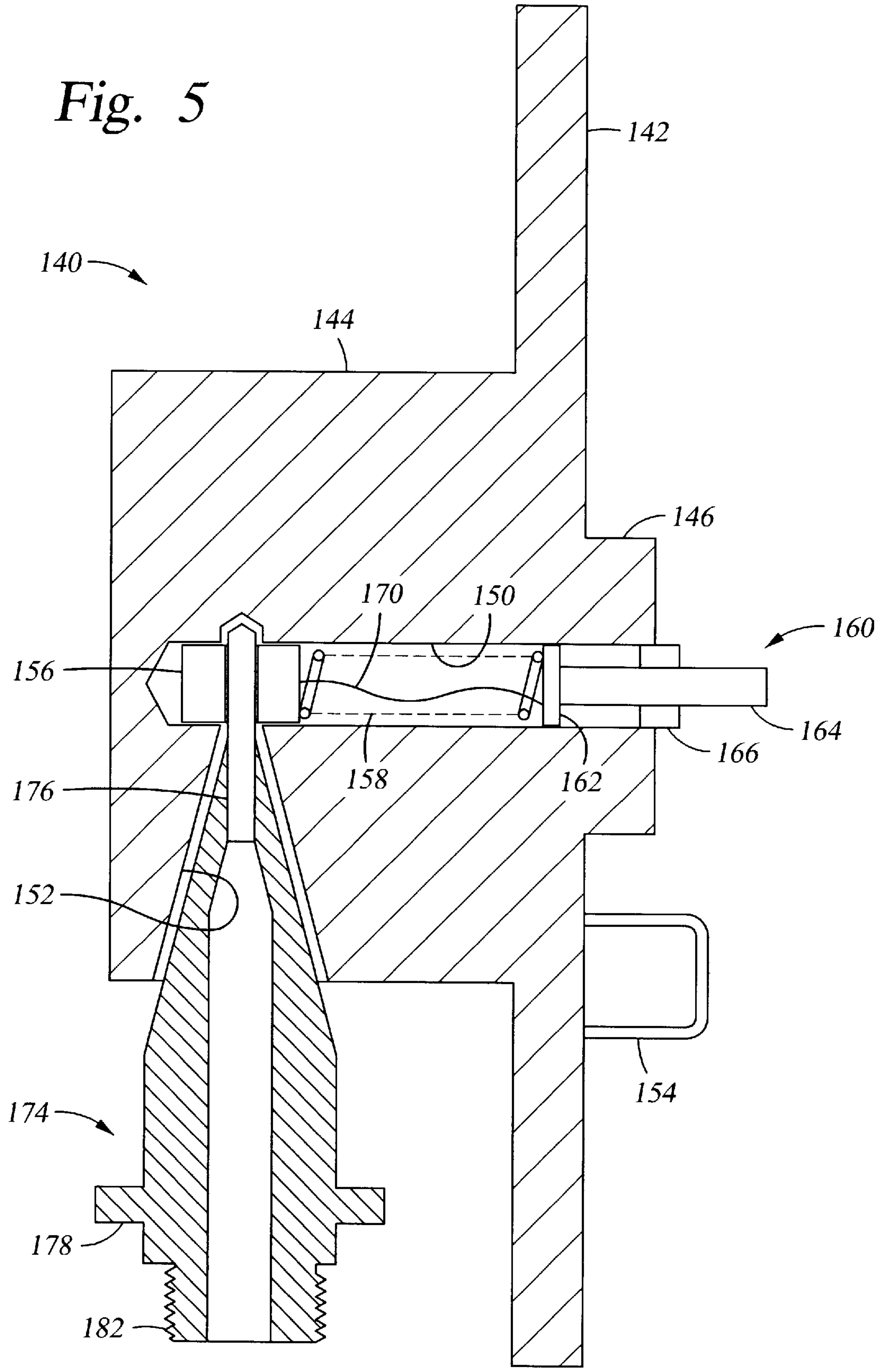
FIG. 5 is a cross-sectional view of a second signal connection device being an alternative embodiment of the invention.

With reference now to FIG. 5 there is shown a cross-sectional view of an second signal connector being an alternative embodiment of the invention.

The second signal connector is suitable for connection with a fuse assembly as described above with reference to FIG. 2.

The signal connection device, as shown in FIG. 5, comprises a body 140 formed as a one-piece plastic moulding. The body includes a disc-shaped head portion 142 and a cylindrical tail portion 144 which projects coaxially from the head portion 144 in a direction, when the connection device is in use, away from the fuse assembly. A boss 146 of circular cross-section projects coaxially from the head portion 142 in the opposite direction. Several retaining clips 154 project from the head portion 142, substantially similar to those of the first embodiment.

An axial blind bore 150 of circular section has an opening at the centre of the boss 146, and extends coaxially through the boss 146 into the body 140. A transverse bore 152 also of circular section extends radially into the body to the tail portion 144 of the body 140 to intersect with the axial bore 150. The transverse bore 152 tapers in diameter in a radially inward direction.

Within the axial bore 150, furthest from the opening, a terminal block 156 is located. The terminal block 154 is a solid brass cylinder, dimensioned to be a close sliding fit within the bore 150. A tapped bore extends diametrically through the terminal block 156.

A brass contact element 160 has a disc-shaped head portion 162 which is a close sliding fit within the bore and an elongate pin portion 164 which extends from the head portion 162 to project out of the opening of the bore 150. A collar 166 is located in the opening of the bore, the collar 166 permitting longitudinal sliding movement of the contact element while substantially preventing transverse movement of the pin portion 162, An electrically conductive wire 170 is secured to the terminal block 156 and to the head portion 162 of the contact element 160. Surrounding the wire 170, a helical spring 158 is located in the bore between the terminal block 156 and the contact element 160.

Connection to the terminal block 156 is made by a probe 174. The probe 174 has an elongate metal contact pin 176 projecting from a plastic insulating body 178. An external screw thread is formed on the contact pin 176. The body 178 has a region which tapers towards the contact pin, the taper angle matching that of the transverse bore 152 of the body 140.

The probe 174 has an externally threaded mounting formation 182 onto which a connector (not shown) can be mounted. The connector has a conductor which extends into the insulating body 178 to make contact with the probe. A conducting lead can extend from the connector to carry signals to remote processing circuitry which will typically be electrically similar to that illustrated in FIG. 4.

During assembly of the signal connection device, the terminal block 156 is located such that its tapped bore is in alignment with the transverse bore 152 of the body 140. The probe 174 is then introduced into the transverse bore 152 and its contact pin 176 is screwed into the tapped bore of the terminal block, to draw the tapered region of the probe body 17B into contact with the tapered region of the bore 152. There is thus created a mechanically secure assembly which has a continuous electrically-conductive path between a lead connected to the probe 174 and the contact element 160.

The signal connection device can be mounted onto a fuse holder as described with reference to the first embodiment. The contact element 160 makes mechanical and electrical contact with the power fuse cartridge 20, and is urged into the body 140 against a force applied to it by compression of the spring 158. When assembled in this manner, the signal connection device provides a conductive path between a mains supply at the power fuse and the probe 174 at which communication signals can be extracted and/or injected.

What is claimed is:

1. A signal connection device for making a communication signal connection to a mains electricity supply, the device being securable to a fuse holder, said fuse holder including an insulating body housing a power fuse of the mains electricity supply, said insulating body having an aperture at one end, wherein said connection device includes:

- a head portion having an axial aperture and including means for attachment to the fuse holder; and
- a communication signal connection connected to a conductive component projecting axially from the aperture in the head portion, so as to make electrical contact with said power fuse through said aperture in said insulating body of said fuse holder.

2. A device according to claim 1 wherein said device is releasably securable to said fuse holder.

3. A device according to claim 1 wherein said device is securable to said fuse holder by mechanical connectors.

4. A device according to claim 3 wherein said mechanical connectors include at least one radially-projecting raised formation on said insulating body of said fuse holder and at least one retaining clip on said head portion of said device.

5. A device according to claim 1 wherein said conductive component is a signal fuse.

6. A device according to claim 1 wherein, in use, said conductive component is in physical contact with said power fuse.

7. A device according to claim 6 wherein said conductive component is held in physical contact with said power fuse by spring means.

8. A device according to claim 1 which has a signal path interconnecting the mains supply and the communication signal connection, which signal path includes a filter which presents a low impedance to communication signals and a high impedance to mains electricity.

9. A device according to claim 8 in which the filter includes one or more series capacitors.

10. A device according to claim 8 in which a conductive path of low impedance to mains electricity is provided between the signal connection and earth.

11. A device according to claim 8 in which the filter is located within the signal connection device.

12. A signal connection device for making a communication signal connection to a mains electricity supply, the device being securable to a fuse holder, said fuse holder including an insulating body housing a power fuse of the mains supply, wherein said signal connection device includes:

- means for releasably attaching the signal connection device to the fuse holder; and,
- a communication signal connection which is connected to a conductive component which projects from the signal connection device so as to make electrical contact with said power fuse.

13. A signal connection installation including a signal connection device and a fuse holder for making a communication signal connection to a mains electricity supply, the signal connection device being secured to the fuse holder, said fuse holder including an insulating body housing a power fuse of the mains supply, said insulating body having an aperture at one end with a radially projecting raised formation, wherein said signal connection device includes:

a head portion having an axial aperture and a retaining clip cooperating with said radially projecting raised formation of said insulating body for the attachment of said head portion to said fuse holder;

a communication signal connection connected to a conductive component, said conductive component consisting of a signal fuse, said signal fuse projecting axially from said aperture in said head portion so as to make electrical contact with said power fuse through said aperture in said insulating body of said fuse holder; and a signal path interconnecting the signal fuse and the communication signal connection, the signal path including a filter which presents a low impedance to communication signals and a high impedance to mains electricity.

14. A signal connection installation including a signal connection device and a fuse holder for making a communication signal connection to a mains electricity supply, the signal connection device being secured to the fuse holder, said fuse holder including an insulating body housing a power fuse of the mains supply, said insulating body having an aperture at one end with a radially projecting raised formation, wherein said signal connection device includes:

a head portion having an axial aperture and a retaining clip cooperating with said radially projecting raised formation of said insulating body for the attachment of said head portion to said fuse holder;

a communication signal connection connected to a conductive component, said conductive component consisting of a cartridge type signal fuse, said signal fuse being slidably held in said aperture in said head portion and projecting axially therefrom so as to make electrical contact with said power fuse through said aperture in said insulating body of said fuse holder, said signal fuse being urged in the direction of said power fuse by a spring located within said aperture in said head portion; and a signal path interconnecting the signal fuse and the communication signal connection, the signal path including a filter which presents a low impedance to communication signals and a high impedance to mains electricity.

* * * * *